(12) United States Patent
Kim et al.

(10) Patent No.: US 10,235,037 B2
(45) Date of Patent: Mar. 19, 2019

(54) DIGITAL DEVICE AND CONTROL METHOD THEREFOR

(71) Applicant: LG ELECTRONICS INC., Seoul (KR)

(72) Inventors: Jongho Kim, Seoul (KR); Sihwa Park, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/536,967

(22) PCT Filed: Dec. 30, 2014

(86) PCT No.: PCT/KR2014/013060
§ 371 (c)(1),
(2) Date: Jun. 16, 2017

(87) PCT Pub. No.: WO2016/108308
PCT Pub. Date: Jul. 7, 2016

(65) Prior Publication Data
US 2017/0351351 A1 Dec. 7, 2017

(51) Int. Cl.
*G06F 3/0488* (2013.01)
*G06F 3/041* (2006.01)

(52) U.S. Cl.
CPC .......... *G06F 3/0488* (2013.01); *G06F 3/041* (2013.01); *G06F 2203/04102* (2013.01); *G06F 2203/04104* (2013.01); *G06F 2203/04804* (2013.01)

(58) Field of Classification Search
CPC .......... G06F 3/041–3/048; G06F 2203/04102; G06F 3/04883; G06F 3/0488; G06F 3/04842; G06F 3/044; G09G 2380/02
See application file for complete search history.

(56) References Cited

U.S. PATENT DOCUMENTS

| | | | |
|---|---|---|---|
| 8,274,484 B2 * | 9/2012 | Baudisch | G06F 1/1626 345/173 |
| 8,810,524 B1 * | 8/2014 | Rosenberg | G06F 1/1643 345/1.1 |
| 9,377,892 B2 * | 6/2016 | Kim | G06F 3/0416 |
| 9,678,582 B2 * | 6/2017 | Kwak | G06F 3/0487 |

(Continued)

FOREIGN PATENT DOCUMENTS

| | | |
|---|---|---|
| KR | 1020140017391 | 2/2014 |
| KR | 1020140091296 | 7/2014 |
| KR | 101433751 | 8/2014 |

OTHER PUBLICATIONS

PCT International Application No. PCT/KR2014/013060, Written Opinion of the International Searching Authority dated Sep. 4, 2015, 26 pages.

*Primary Examiner* — Sanjiv D. Patel
(74) *Attorney, Agent, or Firm* — Lee Hong Degerman Kang & Waimey (57) ABSTRACT

A digital device according to one embodiment of the present specification comprises a flexible display unit, detects a dual touch area where a touch input to the front surface of the flexible display unit and a touch input to the rear surface of the flexible display unit overlap, and can display, adjacently to the detected dual touch area, a user interface corresponding to an event generated in a digital device.

17 Claims, 7 Drawing Sheets

(56) References Cited

U.S. PATENT DOCUMENTS

| | | | |
|---|---|---|---|
| 2010/0117975 A1* | 5/2010 | Cho | G06F 1/1626 |
| | | | 345/173 |
| 2010/0188353 A1* | 7/2010 | Yoon | G06F 3/04883 |
| | | | 345/173 |
| 2011/0053641 A1* | 3/2011 | Lee | G06F 1/1626 |
| | | | 455/556.1 |
| 2011/0163986 A1* | 7/2011 | Lee | G06F 1/1692 |
| | | | 345/173 |
| 2013/0249873 A1* | 9/2013 | Zhang | G09G 3/22 |
| | | | 345/204 |
| 2014/0004906 A1* | 1/2014 | Chi | H04B 1/38 |
| | | | 455/566 |
| 2014/0122912 A1* | 5/2014 | Andou | G06F 1/3265 |
| | | | 713/324 |
| 2014/0289642 A1 | 9/2014 | Prasad | |
| 2014/0375596 A1 | 12/2014 | Kim et al. | |
| 2016/0034132 A1* | 2/2016 | Huang | G06F 3/017 |
| | | | 345/173 |
| 2017/0109916 A1* | 4/2017 | Kurz | G06T 19/006 |

* cited by examiner

DIGITAL DEVICE AND CONTROL METHOD THEREFOR

CROSS-REFERENCE TO RELATED APPLICATIONS

This application is the National Stage filing under 35 U.S.C. 371 of International Application No. PCT/KR2014/013060, filed on Dec. 30, 2014, the contents of which are all hereby incorporated by reference herein in its entirety.

TECHNICAL FIELD

The present specification relates to a digital device and a method of controlling therefor.

BACKGROUND ART

A portable digital device such as a smartphone and a tablet PC is widely disseminated. As the function of the portable digital device is diversified, a demand for a portable digital device equipped with a wider display is increasing. In order to provide a wider display, study on various extendible digital devices is in progress. And, in order to extend a display and increase portability at the same time, study on a digital device having a flexible display is in progress.

Figure 1:
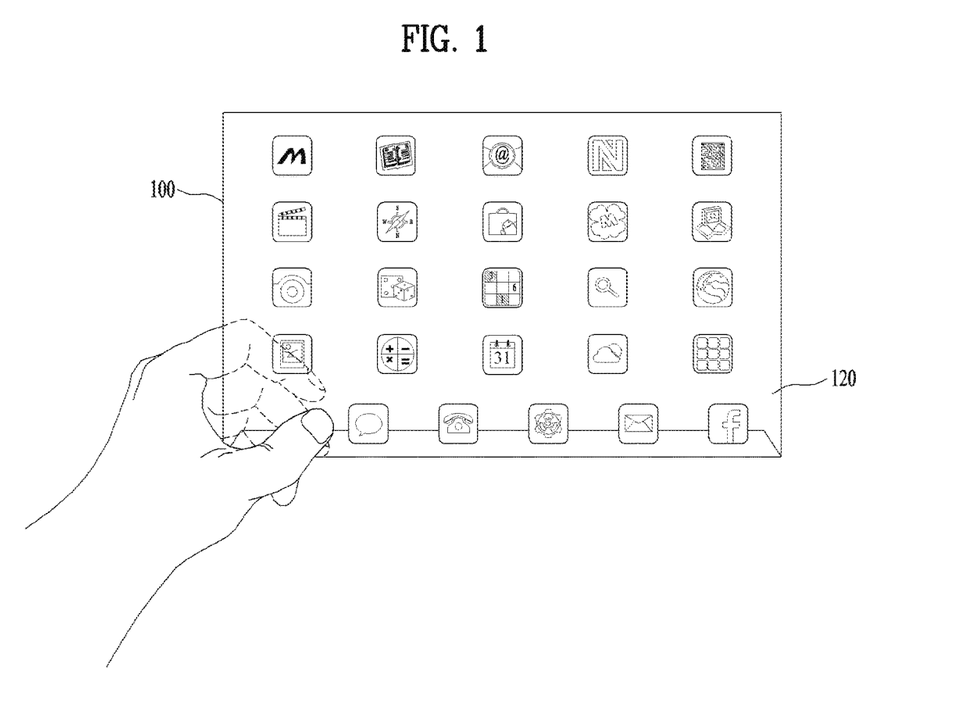
FIG. 1 is a diagram for an example of a digital device.

FIG. 1 is a diagram for an example of a digital device.

A digital device shown in FIG. 1 has a flexible display unit 120. As shown in FIG. 1, a user of the digital device 100 can hold the digital device 100 by one hand. In general, the flexible display unit 120 has a relatively big size. Hence, it is difficult for the user to control the digital device 100 while holding the digital device 100 by one hand. And, due to the flexibility of the flexible display unit 120, it is difficult for the user to touch a point far from a point at which the digital device 100 is held by a hand.

Therefore, it is necessary to have a method capable of more easily controlling the flexible display unit 120.

DISCLOSURE OF THE INVENTION

Technical Task

The present specification intends to provide a digital device providing a user interface based on a dual touch input of a user and a method of controlling therefor. In particular, the present specification intends to provide a digital device capable of being more easily controlled by changing a user interface displayed on a position to which a dual touch of a user is inputted.

Technical Solution

To achieve these and other advantages and in accordance with the purpose of the present invention, as embodied and broadly described, according to one embodiment, a digital device includes a flexible display unit configured to display at least one image, a touch input receiving unit configured to sense a first touch area based on a first touch input inputted on the front side of the flexible display unit and a second touch area based on a second touch input inputted on the rear side of the flexible display unit, and a processor configured to control the flexible display unit and the touch input receiving unit, the processor, if an event for the digital device is detected, configured to display a first user interface corresponding to the event on the flexible display unit, the processor configured to detect a dual touch area based on overlap between the first touch area and the second touch area, the processor, if the first touch area is deactivated, configured to provide a second user interface providing a control of the event to a position adjacent to the detected dual touch area.

To further achieve these and other advantages and in accordance with the purpose of the present invention, according to a different embodiment, a method of controlling a digital device includes the steps of, if an event for the digital device is detected, displaying a first user interface corresponding to the event on a flexible display unit of the digital device, sensing a first touch area based on a first touch input inputted on the front side of the flexible display unit and a second touch area based on a second touch input inputted on the rear side of the flexible display unit using a touch input receiving unit of the digital device, detecting a dual touch area based on overlap between the first touch area and the second touch area, and if the first touch area is deactivated, providing a second user interface providing a control of the event to a position adjacent to the detected dual touch area.

Advantageous Effects

According to the present specification, a digital device can provide an enhanced interface to a user.

According to the present specification, a digital device can provide an easier touch input to a user by providing a user interface corresponding to an event to an area adjacent to a dual touch area of the user.

According to the present specification, a digital device can help a user to control a digital device by one hand by providing a user interface to an area adjacent to a dual touch area of the user.

BEST MODE

While embodiments are concretely described with reference to the attached diagrams and the contents written on the diagrams, the present specification may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Figure 2:
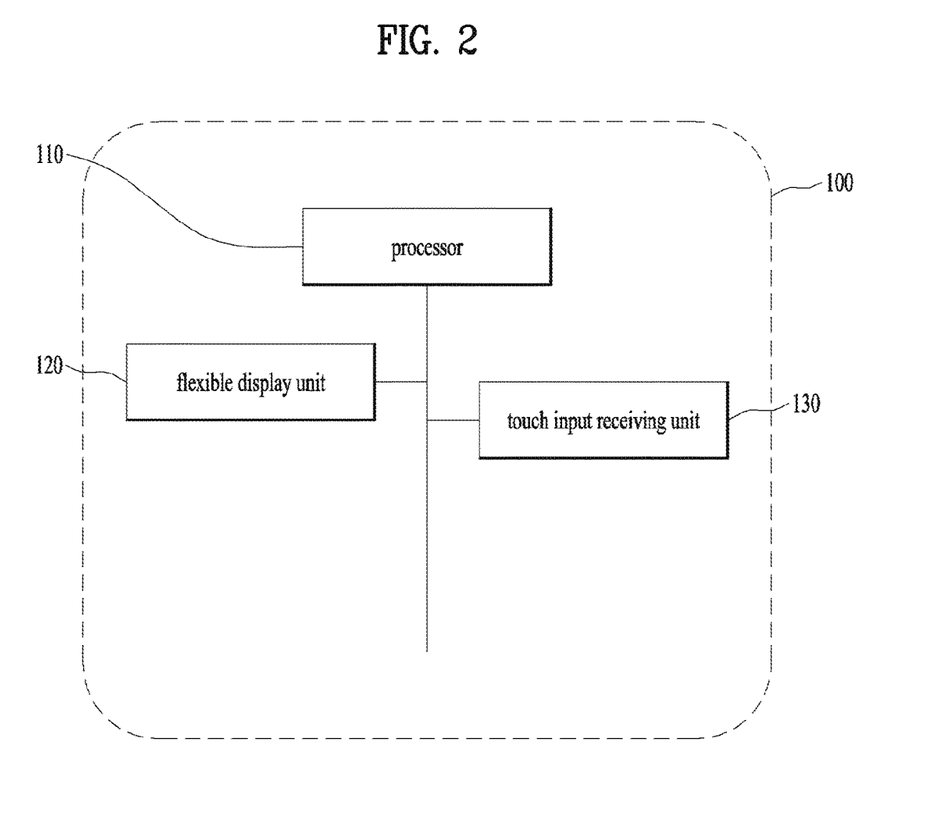
FIG. 2 is a diagram for a configuration of a digital device according to one embodiment.

FIG. 2 is a diagram for a configuration of a digital device according to one embodiment.

A digital device 100 can include a flexible display unit 120, a touch input receiving unit 130, and a processor 110.

The flexible display unit 120 can display at least one image. And, the flexible display unit 120 can be rolled out or extended from a housing of the digital device 100. The flexible display unit 120 can include an OLED (Organic Light Emitting Diode) display or a display of a different type. And. the flexible display unit 120 may include a transparent display.

The touch input receiving unit 130 can receive a touch input inputted on a front side and a rear side of the flexible display unit 120. The touch input receiving unit 130 can be deployed in the front side and/or the rear side of the flexible display unit 120 or can be embedded in the flexible display unit 120. And, the touch input receiving unit 130 of the digital device 100 can detect a position of a touch input inputted on the front side or the rear side of the flexible display unit 120. The touch input receiving unit 130 can sense various touch inputs including a contact touch input and a non-contact touch input. Examples of the touch input include a slide touch input, a multi touch input, a long-press touch input, a short-press touch input, a drag touch input, a hovering input, a flicking touch input, and the like. Moreover, the touch input receiving unit 130 can also sense a touch input inputted by various input tools including a touch pen, a stylus pen, and the like. The touch input receiving unit 130 can forward a sensed touch input to the processor 110.

The processor 110 can control the flexible display unit 120 and the touch input receiving unit 130. The processor 110 processes data of the digital device 100 to execute various applications. The processor 110 can control the digital device 100 and contents executed in the digital device 100 based on a command.

Meanwhile, the configuration of the digital device 100 shown in FIG. 2 corresponds to a block diagram according to one embodiment. Blocks represented in a manner of being separated logically show hardware configuration units of the digital device 100. Hence, the aforementioned configuration units of the digital device 100 can be implemented by a single chip or a plurality of chips depending on the design of the digital device 100.

Figure 3:
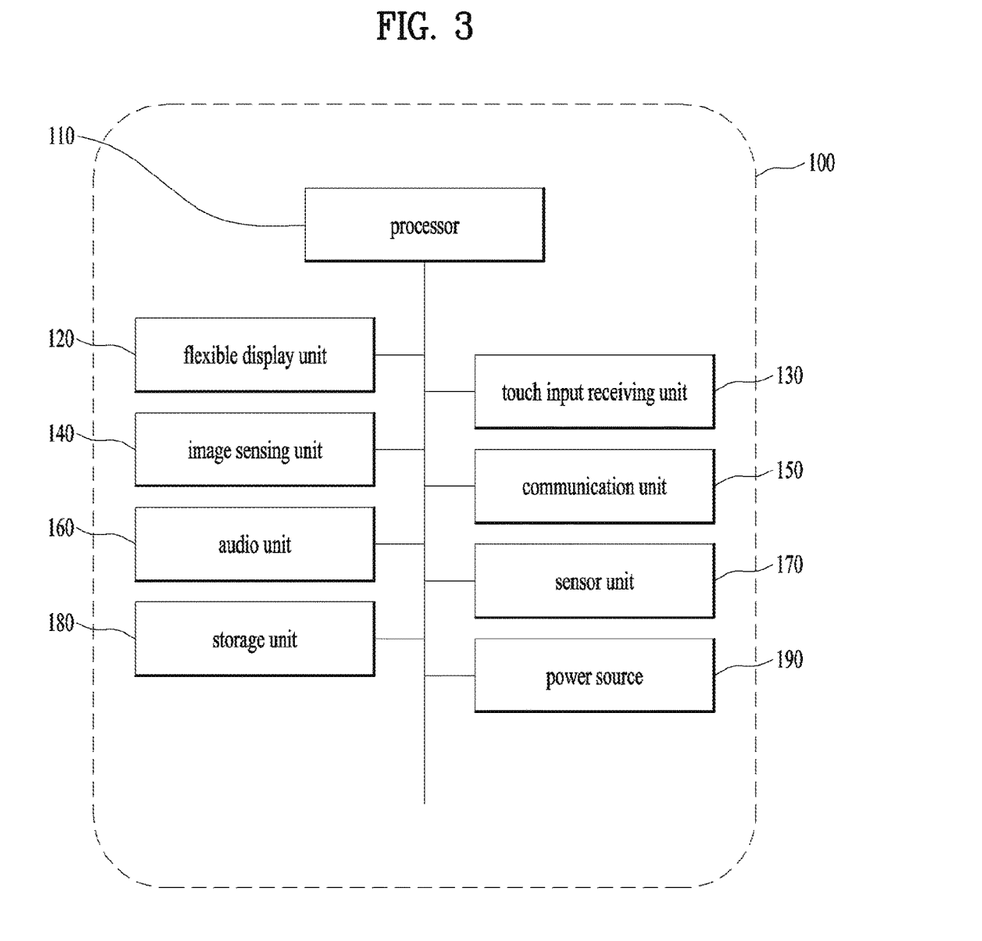
FIG. 3 is a diagram for a configuration of a digital device according to a different embodiment.

FIG. 3 is a diagram for a configuration of a digital device according to a different embodiment.

Meanwhile, the digital device 100 can further include configurations not shown in FIG. 2. In the following, for clarity, explanation on configurations overlapped with the configurations shown in FIG. 2 is omitted.

The digital device 100 can include an image sensing unit 140. The image sensing unit can include at least one camera. The camera of the image sensing unit 140 can be deployed to the front side and/or the rear side of the digital device 100. The image sensing unit 140 can sense an image using infrared rays and/or ultraviolet rays.

The digital device 100 can include a communication unit 150. The communication unit 150 can communicate with an external device. The communication unit 150 can receive information and/or data from one or more external devices. The communication unit 150 performs communication with the external device using various protocols via a wired or wireless network and can transceive data with the external device. For example, in order to access an external device and/or a wireless network, the communication unit 150 may use such a standard as Wireless LAN (WLAN), IEEE 802.11 based wireless LAN communication, Wireless Broadband (WiBro), World Interoperability for Microwave Access (Wi-MAX), High Speed Downlink Packet Access (HSDPA), Bluetooth, Near Field Communication (NFC), and the like. And, the communication nit 150 can access the Internet via a wired/wireless network.

The digital device 100 can include an audio unit 160. The digital device 100 can receive voice input or provide auditory feedback via the audio unit 160. The audio unit 160 can include one or more speakers and/or microphones.

The digital device 100 can include a sensor unit 170. For example, the sensor unit 170 can include a GPS sensor, an image sensor, an infrared sensor, a motion sensor, a heart rate sensor, a fingerprint sensor, a sound sensor, a touch sensor, and/or a gyro sensor. The digital device 100 can sense context information of the digital device 100 based on a signal received from the sensor unit 170.

The digital device 100 can include a storage unit 180. The storage unit 180 can be implemented by a single chip of a plurality of chips. The storage unit can store application data, multimedia data, system data, and the like. The processor 110 can control the digital device 100 using data stored in the storage unit 180. The storage unit 180 may correspond to various digital information storage spaces such as a flash memory, a RAM (random access memory), an SSD (solid state drive), and the like.

The digital device 100 can include a power source 190. The power source can include a disposable battery, a rechargeable battery, and/or an energy storing means. Yet, the digital device 100 can receive power from an external power source as well.

Meanwhile, the configuration of the digital device 100 shown in FIG. 3 corresponds to a block diagram according to one embodiment. Blocks represented in a manner of being separated logically show hardware configuration units of the digital device 100. Hence, the aforementioned configuration units of the digital device 100 can be implemented by a single chip or a plurality of chips depending on the design of the digital device 100.

Moreover, the digital device 100 can further include configurations not shown in FIG. 3 such as housing. For example, the digital device 100 can further include a bending sensing unit configured to sense bending of the flexible display unit 120. The bending sensing unit measures pressure, electric charge, resistance and/or voltage of the flexible display unit 120 to sense whether or not the flexible display unit 120 is bent and a bending axis. The processor 110 can control not only the configurations shown in FIG. 3 but also configurations not shown in FIG. 3.

In the following, if each step or operation performed in the digital device 100 is initiated or progressed by sensing a user input, assume that a procedure of generating and receiving a signal according to the sensed user input is included in the aforementioned procedure. And, it is able to represent as the processor 110 controls the digital device 100 or at least one unit included in the digital device 100 according to the user input. In the following, the processor 110 and the digital device 100 can be explained in a manner of being regarded as the same.

Figure 4:
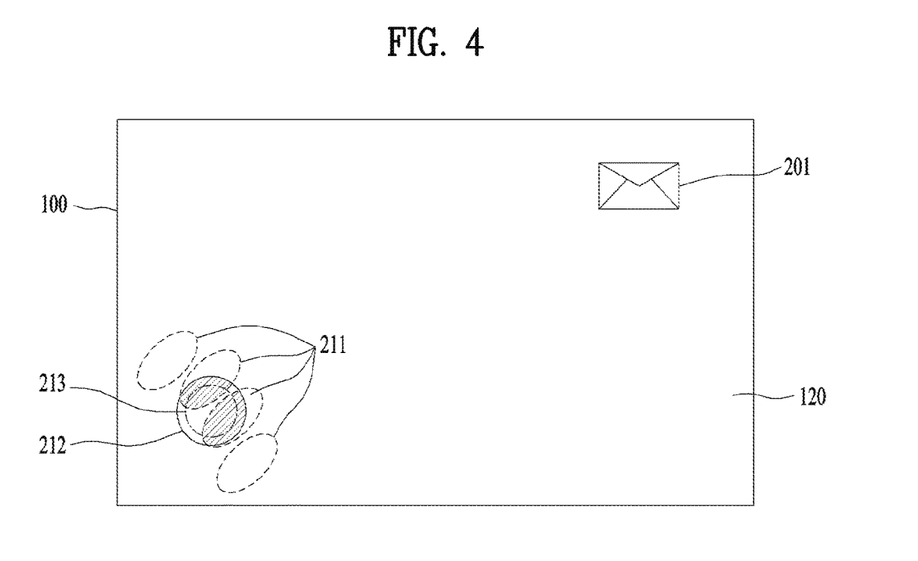
FIG. 4 is a diagram for a dual touch area detected according to one embodiment.

FIG. 4 is a diagram for a dual touch area detected according to one embodiment.

If an event for the digital device 100 is detected, the digital device 100 can display a first user interface 201 corresponding to the event on the flexible display unit 120. In an example of FIG. 4, an incoming message event is detected in the digital device 100. The digital device 100 can display the first user interface 201 in response to the incoming message event. The first user interface 201 corresponds to a notification for the detected event and can control the event. For example, as shown in FIG. 4, the digital device 100 can display the first user interface 201 having a letter shape in response to the incoming event. The first user interface 201 can include an icon and/or an image. And, a user can control the event via an input inputted on the first user interface 201. For example, the user can touch the first user interface 201 and the digital device 100 can provide a menu for checking a message, replying the message, and terminating the first interface 201 in response to the touch input.

Referring to FIG. 4, a user holds the bottom left of the digital device 100 using a left hand. On the contrary, the first user interface 201 is displayed on the top right of the digital device 100. In this case, it is difficult for the user to touch the first user interface 201 using the left hand of the user. And, due to the flexibility of the flexible display unit 120, it is difficult to touch the first user interface 201 using other hand. Hence, it is necessary to display a user interface corresponding to the detected event on an area adjacent to a part of the digital device 100 held by the user.

Referring to FIG. 4, the thumb of the user performs a touch input on the front side of the flexible display unit 210. A touch area touched by a front side touch is depicted as a first touch area 212. The rest of the fingers of the user perform a touch input on the rear side of the flexible display unit 210. A touch area touched by a rear side touch is depicted as a second touch area 211.

The digital device 100 can detect a dual touch area 213 based on overlap between the first touch area 212 and the second touch area 211. The dual touch area corresponds to an area capable of being estimated as the user holds the digital device 100. As mentioned in the following with reference to FIG. 5, the dual touch area 213 may become a reference point for switching the first user interface 201.

Referring to FIG. 4, an area overlapped between the first touch area 212 and the second touch area 211 is represented by a slashed part. The digital device 100 detects the dual touch area 213 based on the overlapped area. The dual touch area 213 may correspond to an area of a predetermined shape capable of including most of overlapped area. Yet, the dual touch area 213 and the overlapped area can be identically detected. Moreover, the dual touch area 213 can be detected based on a probabilistic analysis for the overlapped area.

Figure 5:
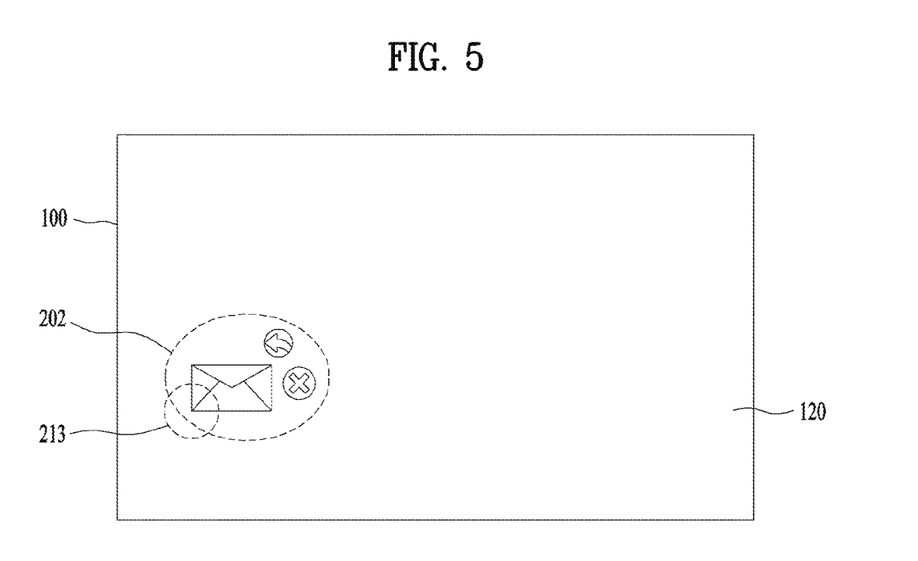
FIG. 5 is a diagram for a second user interface according to one embodiment.

FIG. 5 is a diagram for a second user interface according to one embodiment.

In FIG. 4, an event for the digital device 100 is detected, a first user interface is displayed in response to the event, and a dual touch area is detected. In this case, if a touch input inputted on the front side of the flexible display unit 120 is deactivated among the dual touch input, the digital device 100 can provide the second user interface 202, which controls the detected event, to a position adjacent to the detected dual touch area 213. Meanwhile, the digital device 100 can provide the second user interface 202 to the detected dual touch area 213. For example, the digital device 100 can make the second user interface 202 to be positioned at the center of the dual touch area 213.

For example, a user may lift the thumb of the user up from the flexible display unit 120 to deactivate the touch input inputted on the front side of the flexible display unit 120. If the touch input inputted on the front side of the flexible display unit 120 is deactivated, the digital device 100 can provide a second user interface 202 instead of the first user interface. The second user interface is located in the vicinity of the dual touch area 213 corresponding to an area estimated as being held by the user. Hence, for example, the user can touch the second user interface 202 using the lifted thumb to control the occurred event.

The second user interface 202 can include at least one selected from the group consisting of checking an incoming message, replying to the message, and terminating the second user interface 202. For example, as shown in FIG. 5, if a user touches "x" mark, the user can terminate the second user interface 202. If the user touches a letter shape icon of the second user interface 202, the user can check contents of the message. If the user touches an icon of an arrow shape, the user can replay to the message.

In FIGS. 4 and 5, an incoming message event has been explained as an example. Yet, similar operations can be performed on an incoming call event as well. For example, if an incoming call event is detected, the digital device 100 can display a first user interface on the flexible display unit 120 in response to the incoming call event. In this case, if a dual touch area 213 is detected, the digital device can display a second user interface capable of controlling the incoming call event on an area adjacent to the dual touch area 213. For example, the second user interface can include at least one selected from the group consisting of replying to the incoming call event, rejecting the incoming call event, and transmitting a predetermined message.

The first user interface and the second user interface can provide a control of a different type, respectively. For example, the first user interface may provide a simple access only for an event. For example, if a user touches the first user interface, the user can check an event only. On the contrary, the second user interface may provide an active response. For example, if the user touches the second user interface, the user can reply to the event and/or terminate the event.

The second user interface may correspond to a lower step of the first user interface. For example, the first user interface may correspond to a notification for an occurred event and the second user interface may correspond to a more intensified user interface which is provided based on an input for the notification. For example, the second user interface can include an authentication interface providing an access for an event. For example, the authentication interface can authenticate a user based on at least one selected from the group consisting of a fingerprint, a password, and a pattern. For example, the first user interface may correspond to a notification for a received message. The second interface may correspond to an authentication interface using a pattern input for checking the received message.

Figure 6:
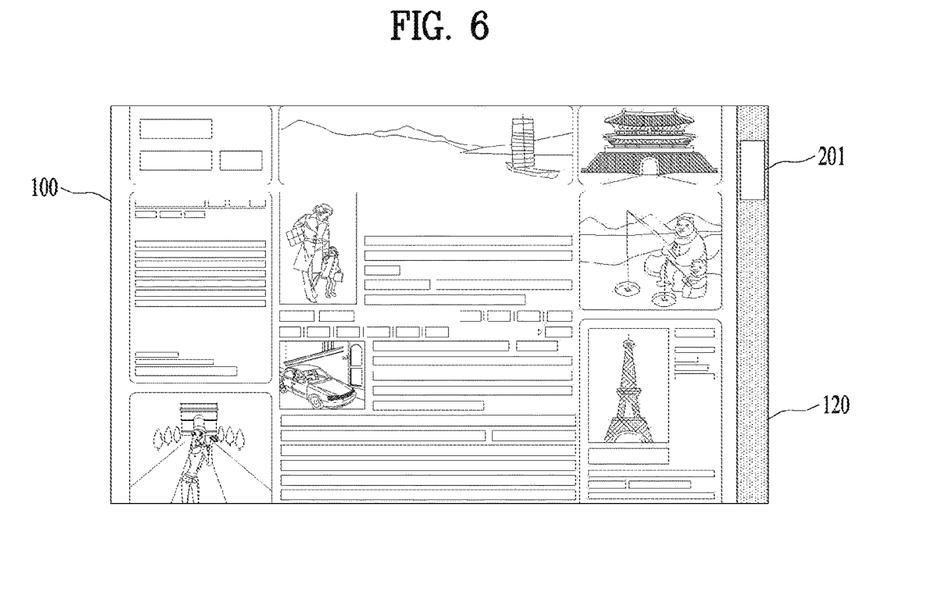
FIG. 6 is a diagram for a first user interface according to one embodiment.

FIG. 6 is a diagram for a first user interface according to one embodiment.

In FIGS. 4 and 5, a user interface provided by the digital device 100 in response to an incoming call event and an incoming message event has been explained. Yet, embodiments of the digital device 100 are not restricted to the aforementioned embodiments.

A detected event can include execution of an application in the digital device 100. In FIG. 6, a web browser application is executed in the digital device 100. If the execution of the web browser is detected, the digital device 100 can display a first user interface 201 corresponding to the application. For example, the digital device 100 can provide a scroll bar for scrolling a web page as the first user interface 201.

Figure 7:
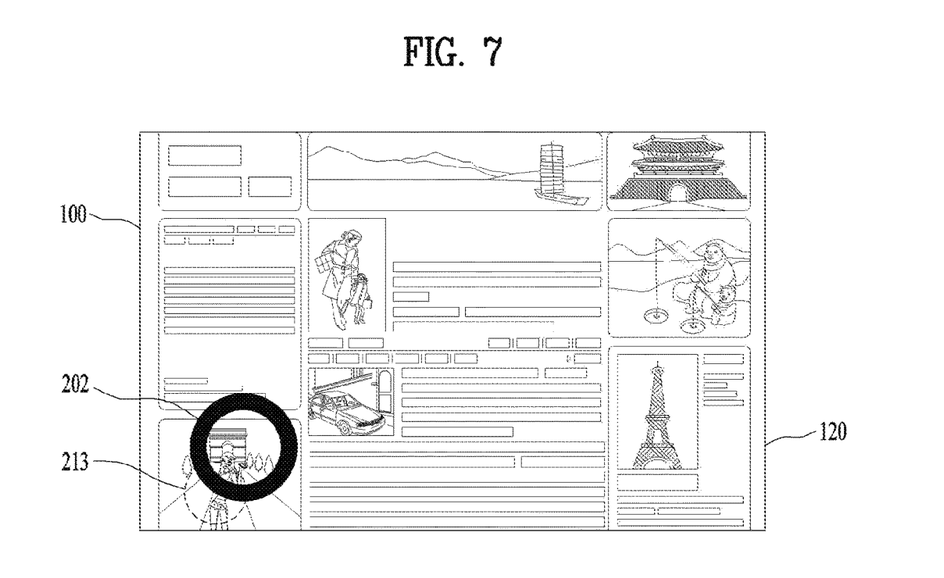
FIG. 7 is a diagram for a second user interface according to a different embodiment.

FIG. 7 is a diagram for a second user interface according to a different embodiment.

Figure 8:
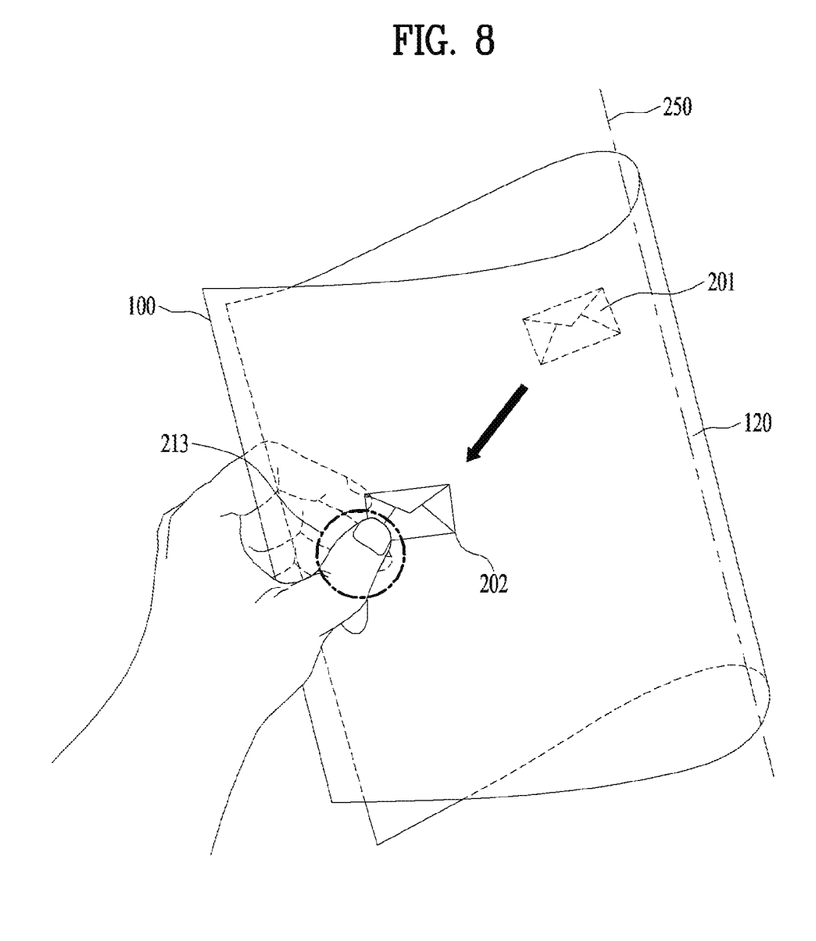
FIG. 8 is a diagram for a second user interface according to a further different embodiment.

After the first interface is provided in FIG. 6, a user performs a dual touch input on the flexible display unit 120. In FIG. 8, a dual touch area 213 positioned at the bottom left of the flexible display unit 120 is detected based on the dual touch input of the user. After the dual touch area 213 is detected, the user deactivates a touch input inputted on the front side of the flexible display unit 120. If the touch input inputted on the front side is deactivated, the digital device 100 can provide a second user interface 202 to an area adjacent to the detected dual touch area 213. The second user interface 202 can include a control for an executed application. In the embodiment of FIG. 7, the user can scroll a web page in all directions by sliding a circle in the second user interface 202.

In FIGS. 4 and 5, the first and the second user interface have a similar shape. Yet, as shown in FIGS. 6 and 7, the first and the second user interface may have a difference in at least one selected from the group consisting of a size, a color, and a shape. Moreover, as shown in FIGS. 6 and 7, although the same control (e.g., scrolling) is provided, the first and the second user interface can be differently arranged.

Meanwhile, in FIGS. 4 to 7, the second interface is provided after the first user interface is terminated. However, although a touch input inputted on the front side is deactivated in the middle of inputting a dual touch input, the digital device 100 can maintain the first user interface. A user can control an event using the displayed first and the second interface. If the first user interface is maintained, the user can control the event using other hand rather than a hand holding the digital device 100.

FIG. 8 is a diagram for a second user interface according to a further different embodiment.

Referring to FIG. 8, a first user interface 201 is provided in response to occurrence of an event. If a touch input inputted on the front side is deactivated after a dual touch area 213 is detected, the digital device 100 displays a second user interface 213 on an area adjacent to the dual touch area 213. Operations of the digital device 100 mentioned earlier with reference to FIGS. 4 to 7 can be similarly applied to the embodiment of FIG. 8.

Yet, in the embodiment of FIG. 8, the digital device 100 is folded among with a bending axis 250. The digital device 100 can detect whether or not the flexible display unit 120 is folded using a bending sensing unit configured to sense bending of the flexible display unit 120.

Referring to FIG. 8, a user performs a dual touch input on the flexible display unit 120. Yet, since the flexible display unit 120 is folded, the touch input of the user is inputted to the front side of the flexible display unit 120 only.

Hence, if the folding of the flexible display unit 120 is sensed, the digital device 100 can define a side of the flexible display unit 120 facing a user as a front side and define an opposite side as a rear side. In particular, if the flexible display unit 120 is folded, the digital device 100 can detect the dual touch area based on the bending axis 250 and positions of sensed touch inputs.

The digital device 100 can further include an image sensing unit. The digital device 100 can detect a side of the flexible display unit 120 facing at a user using the image sensing unit. For example, the digital device 100 can detect the side of the flexible display unit 120 facing at the user by sensing a face, a nose, a mouth, and/or ears of the user.

Moreover, if a touch input, which is inputted on the side of the flexible display unit 120 facing at the user, is deactivated in the middle of inputting a dual touch input, the digital device 100 can provide a second user interface 202 to the side of the flexible display unit 120 facing at the user.

Figure 9:
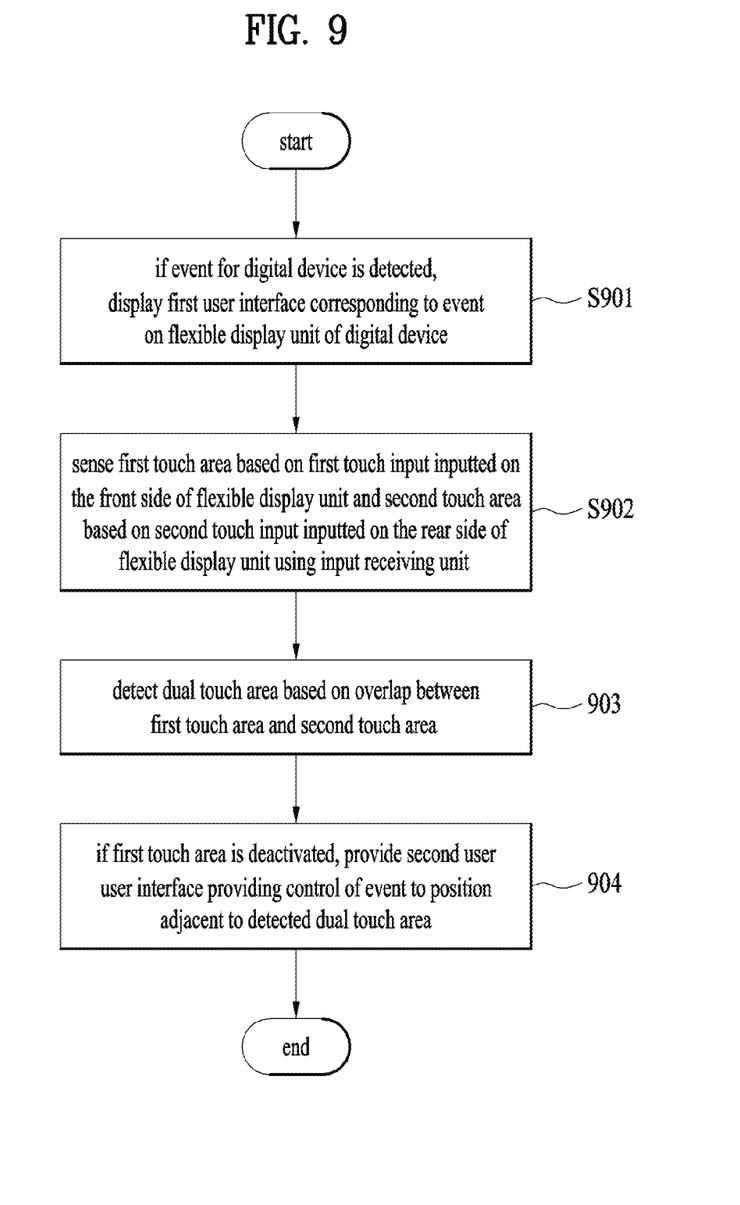
FIG. 9 is a flowchart for a method of controlling a digital device according to one embodiment.

FIG. 9 is a flowchart for a method of controlling a digital device according to one embodiment.

If an event for a digital device is detected, the digital device can display a first user interface on a flexible display unit in response to the event [S901]. As mentioned earlier in FIGS. 4 to 7, various events can be included in the event for the digital device.

The digital device senses a first touch area based on a first touch input inputted on the front side of the flexible display unit and a second touch area based on a second touch input inputted on the rear side of the flexible display unit using an input receiving unit [S902]. As mentioned earlier in FIG. 2, the input sensing unit can sense a touch input using pressure, electric charge, resistance and/or voltage. If the flexible display unit is bent, as mentioned earlier in FIG. 8, the front side and the rear side of the flexible display unit can be defined on the basis of a side facing at a user.

The digital device detects a dual touch area based on an overlapped area between the first touch area and the second touch area [S903]. As mentioned earlier in FIG. 4, the dual touch area can also be detected based on a probabilistic similarity.

When the first touch input is deactivated, the digital device can provide the second user interface providing a control of an event to an area adjacent to the detected dual touch area [S904]. As mentioned earlier in FIGS. 4 to 7, the first and the second user interface can include a control, a shape, and/or a type different from each other.

The method of controlling the digital device mentioned in FIG. 9 can be selectively combined with the operations of the digital device mentioned earlier in FIGS. 2 to 8. A digital device and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a digital device and a method of controlling therefor can be implemented with software readable by a processor in a recording media readable by the processor, which is equipped in the digital device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

MODE FOR INVENTION

Industrial Applicability

The present invention can be used in a terminal device and is usable in the industry having possibility of repetition.

What is claimed is:

1. A digital device, comprising:
   a flexible display;
   a touch input receiving unit configured to sense touch received at a front side of the flexible display and sense touch received at a rear side of the flexible display; and
   a processor configured to:
   cause the flexible display to display a first user interface corresponding to a detection of an incoming message event;
   detect a dual touch to the flexible display based on input from the touch input receiving unit, wherein the dual touch comprises a first touch input received at a first touch area of the front side of the flexible display and a second touch input received at a second touch area of the rear side of the flexible display, wherein the first touch area at least partially overlaps the second touch area; and
   cause the flexible display to display a second user interface together with the first user interface corresponding to the detection of the incoming message event in response to releasing the first touch input from the first touch area and maintaining the second touch input at the second touch area, wherein location of the flexible display at which the second user interface is displayed is based upon location at which the first touch area at least partially overlaps the second touch area.

2. The digital device of claim 1, wherein the second user interface comprises at least one of checking a message of the incoming message event, replying to the message event, or terminating the incoming message event.

3. The digital device of claim 1, wherein the second user interface is different from the first user interface in at least one of a size, a color, or a shape.

4. The digital device of claim 3, wherein the second user interface is different from the first user interface in arrangement of at least one control element.

5. The digital device of claim 1, wherein the first user interface comprises a notification of the incoming message event.

6. The digital device of claim 5, wherein the second user interface comprises an authentication interface for controlling access to the incoming message event.

7. The digital device of claim 6, wherein the authentication interface authenticates a user based on at least one of a fingerprint, a password, or a pattern.

8. The digital device of claim 1, wherein the processor is further configured to:
   maintain the displaying of the first user interface while the dual touch is being detected.

9. The digital device of claim 1, further comprising:
   a bending sensing unit configured to sense bending of the flexible display unit, wherein the processor is further configured to:
   detect whether the flexible display unit is folded based on an input from the bending sensing unit; and
   when the flexible display unit is detected as being folded, a side of the digital device facing a user is defined as the front side of the flexible display unit and an exposed opposite side is defined as the rear side of the flexible display unit.

10. The digital device of claim 9, further comprising an image sensing unit, wherein the processor is further configured to:
    detect the side facing the user based on an image received from the image sensing unit.

11. The digital device of claim 9, wherein the processor is further configured to cause the flexible display to display the second user interface at a location adjacent to the dual touch area on the side facing the user.

12. The digital device of claim 1, wherein the flexible display comprises a transparent display.

13. The digital device of claim 1, wherein the touch input receiving unit is further configured to detect pressure of a touch input received at the flexible display, and wherein the processor is further configured to detect the dual touch based on the detected pressure.

14. The digital device of claim 13, wherein the touch input receiving unit is further configured to detect the pressure by sensing at least one of the pressure or electric charge on the flexible display unit.

15. A method of controlling a digital device having a flexible display, the method comprising:
    displaying, on the flexible display, a first user interface that corresponds to detection of an incoming message event;
    detecting a dual touch to the flexible display, wherein the dual touch comprises a first touch input received at a first touch area of the front side of the flexible display and a second touch input received at a second touch area of the rear side of the flexible display, wherein the first touch area at least partially overlaps the second touch area; and
    displaying, on the flexible display, a second user interface together with the first user interface corresponding to the detection of the incoming message event in response to releasing the first touch input from the first touch area and maintaining the second touch input at the second touch area, wherein location of the flexible display at which the second user interface is displayed is based upon location at which the first touch area at least partially overlaps the second touch area.

16. The method of claim 15, wherein the second user interface comprises an authentication interface for controlling access to the incoming message event.

17. The method of claim 16, wherein the authentication interface authenticates a user based on at least one of a fingerprint, a password, or a pattern.

* * * * *